United States Patent
Singh et al.

(10) Patent No.: US 7,538,823 B1
(45) Date of Patent: May 26, 2009

(54) LUMINANCE/CHROMINANCE VIDEO DATA SEPARATION CIRCUITS AND METHODS AND VIDEO SYSTEMS UTILIZING THE SAME

(75) Inventors: Rahul Singh, Austin, TX (US); James Antone, Austin, TX (US); John Laurence Melanson, Austin, TX (US); Daniel O. Gudmundson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 656 days.

(21) Appl. No.: 11/234,788

(22) Filed: Sep. 23, 2005

(51) Int. Cl.
*H04N 9/78* (2006.01)
(52) U.S. Cl. .................... 348/663; 348/667; 348/665
(58) Field of Classification Search .............. 348/663, 348/665, 667, 666, 662, 713, 712, 536, 537
See application file for complete search history.

(56) References Cited

U.S. PATENT DOCUMENTS 6,300,985 B1 * 10/2001 Lowe et al. .............. 348/665
7,324,163 B2 * 1/2008 Bacche .................... 348/663

* cited by examiner

*Primary Examiner*—David L Ometz
*Assistant Examiner*—Jean W Désir
(74) *Attorney, Agent, or Firm*—Thompson & Knight LLP; James J. Murphy

(57) ABSTRACT

A method of separating a chroma data component from a video data stream includes determining a phase relationship between a color burst in digital video data samples of a composite video signal and a local clock signal which processes the digital video data samples. In response to determining the phase relationship, interpolation filtering is performed on the digital video data samples corresponding to first and second display lines to generate phase aligned video data samples. Adaptive filtering is then performed utilizing the phase aligned video data samples corresponding to the first and second display lines to separate the chroma component from the digital video data samples corresponding to the first display line.

18 Claims, 11 Drawing Sheets

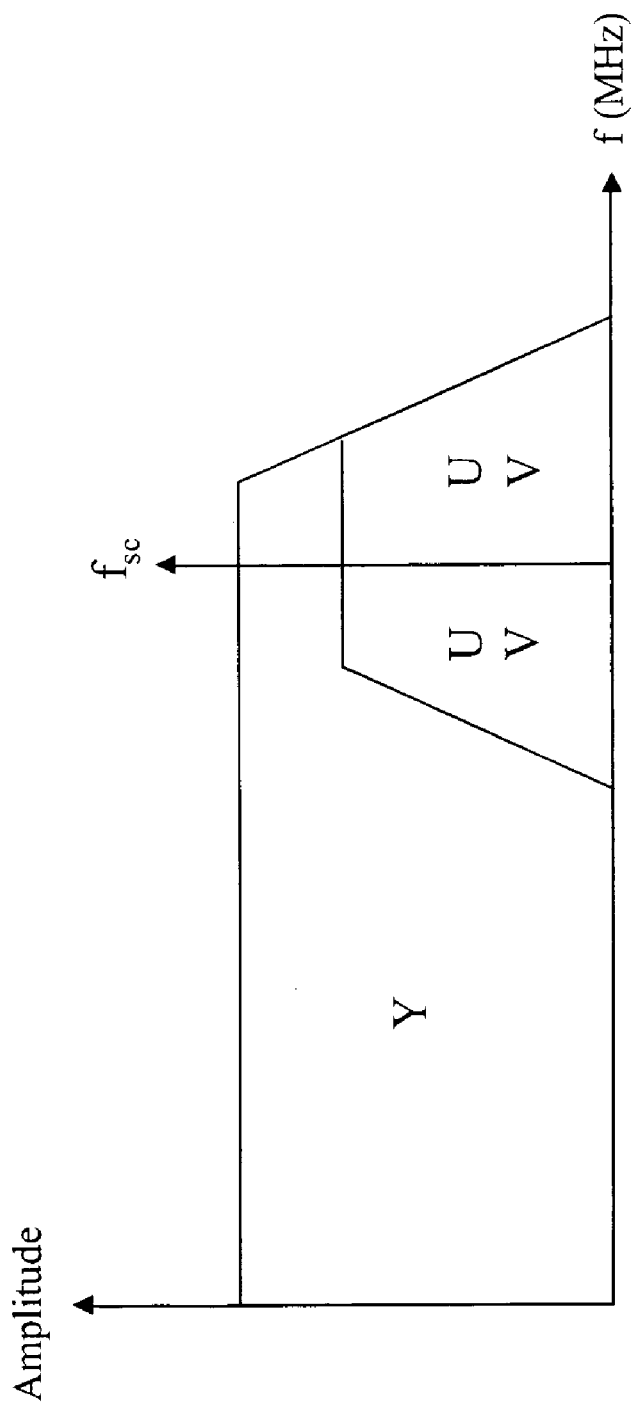

LUMINANCE/CHROMINANCE VIDEO DATA SEPARATION CIRCUITS AND METHODS AND VIDEO SYSTEMS UTILIZING THE SAME

FIELD OF INVENTION

The present invention relates in general to video processing, and in particular, to luminance/chrominance video data separation circuits and methods and video systems utilizing the same.

BACKGROUND OF INVENTION

In both the National Television System Committee (NSTC) and Phase Alternating Line (PAL) standard video systems, video data may be transmitted as a single composite signal carrying both brightness and color information. Specifically, a composite video signal includes synchronization information, a luminance or "luma" (Y) component and a chrominance or "chroma" (C) component. The C component is generated by modulating U and V color components with a color subcarrier of a given color subcarrier frequency, in which the U component is the difference between the Y component and the blue color content and the V component is difference between the Y component and the red color content.

In both the NTSC and PAL systems, frames of composite video data are transmitted as two interleaved fields of lines of display pixels. Generally, each line of pixels is transmitted as a horizontal synchronization signal, a color burst signal, and the active composite video Y and C components. The horizontal synchronization signal indicates the start of the transmission of the line and gates the following color burst signal into the color synchronization circuitry. As discussed below, the color burst signal controls the recovery of the U and V color components from the received C component during demodulation. Generally, the color burst is a sample of video data represented by the subcarrier signal, which has been modulated such that the V component has a zero (0) value and the U component has a non-zero value.

A typical composite video decoder in the receiving system includes a Y/C separator stage that separates the Y and C components prior to extraction of the U and V components. For example, in an NTSC system, the C components for corresponding pixels of alternating display lines are one hundred and eighty (180) degrees out of phase. Hence, in three-line adaptive comb filtering, the pixel data from the previous and following display lines are subtracted from the pixel data from the current display line to cancel out the luma components and extract sets of C components. Similarly, the pixel data from the previous and following display lines are added to the pixel data from the current line to cancel out the C components and extract sets of Y components. Correlation between the pixel data of the current and previous display lines and between the current and the following display lines is utilized to select a set of extracted Y and C components for further processing.

A typical video decoder also includes a phase locked loop, which generates cosine and sine signals at the color subcarrier frequency for demodulating the C component of the composite video signal. Specifically, the cosine and sine signals are locked in phase and frequency to the color subcarrier frequency of color burst signal of each received line. The cosine and sine signals are locked in frequency and ninety degrees (90°) out-of-phase with respects to each other. Generally, the cosine signal demodulates the C component of the composite video signal to recover the V color component and the sine signal demodulates the C component of the composite video signal to recover the U color component, following separation of the Y and C components.

One significant problem with current Y/C separation techniques results from non-ideal phase differences between pixel data of adjacent display lines, due to factors such as clock jitter and noise. For example, in an NTSC display system, the phase difference between the C components of pixel values of adjacent display lines may not be exactly one hundred and eighty (180) degrees. Consequently, errors occur when pixel values from the adjacent are added and subtracted during the separation of the Y and C components, which can result in anomalies on the display screen.

Hence, in order to minimize anomalies in the video display systems operating on composite video, new techniques are required for addressing the problem of clock signal phase relationship during Y/C separation. These techniques should be applicable to both NTSC and PAL standard systems, although not necessarily limited thereto.

SUMMARY OF INVENTION

Embodiments of the present invention allow for the separation of Y and C video components from a video data stream and which produce a minimum of display anomalies According to one representative embodiment, a method is disclosed for separating a chroma data component from a video data stream includes determining a phase relationship between a color burst in digital video data samples of a composite video signal and a local clock signal which processes the digital video data samples. In response to determining the phase relationship, interpolation filtering is performed on the digital video data samples corresponding to first and second display lines to generate phase aligned video data samples. Adaptive filtering is then performed utilizing the phase aligned video data samples corresponding to the first and second display lines to separate the chroma component from the digital video data samples corresponding to the first display line.

Embodiments of the principles of the present invention advantageously minimize display anomalies caused by variations in the display line to display line phase relationships from the ideal defined by the corresponding standard.

BRIEF DESCRIPTION OF DRAWINGS

For a more complete understanding of the present invention, and the advantages thereof, reference is now made to the following descriptions taken in conjunction with the accompanying drawings, in which:

FIG. 2A is an amplitude versus frequency plot of a representative composite video signal;

DETAILED DESCRIPTION OF THE INVENTION

The principles of the present invention and their advantages are best understood by referring to the illustrated embodiment depicted in FIGS. 1-6 of the drawings, in which like numbers designate like parts.

Figure 1:
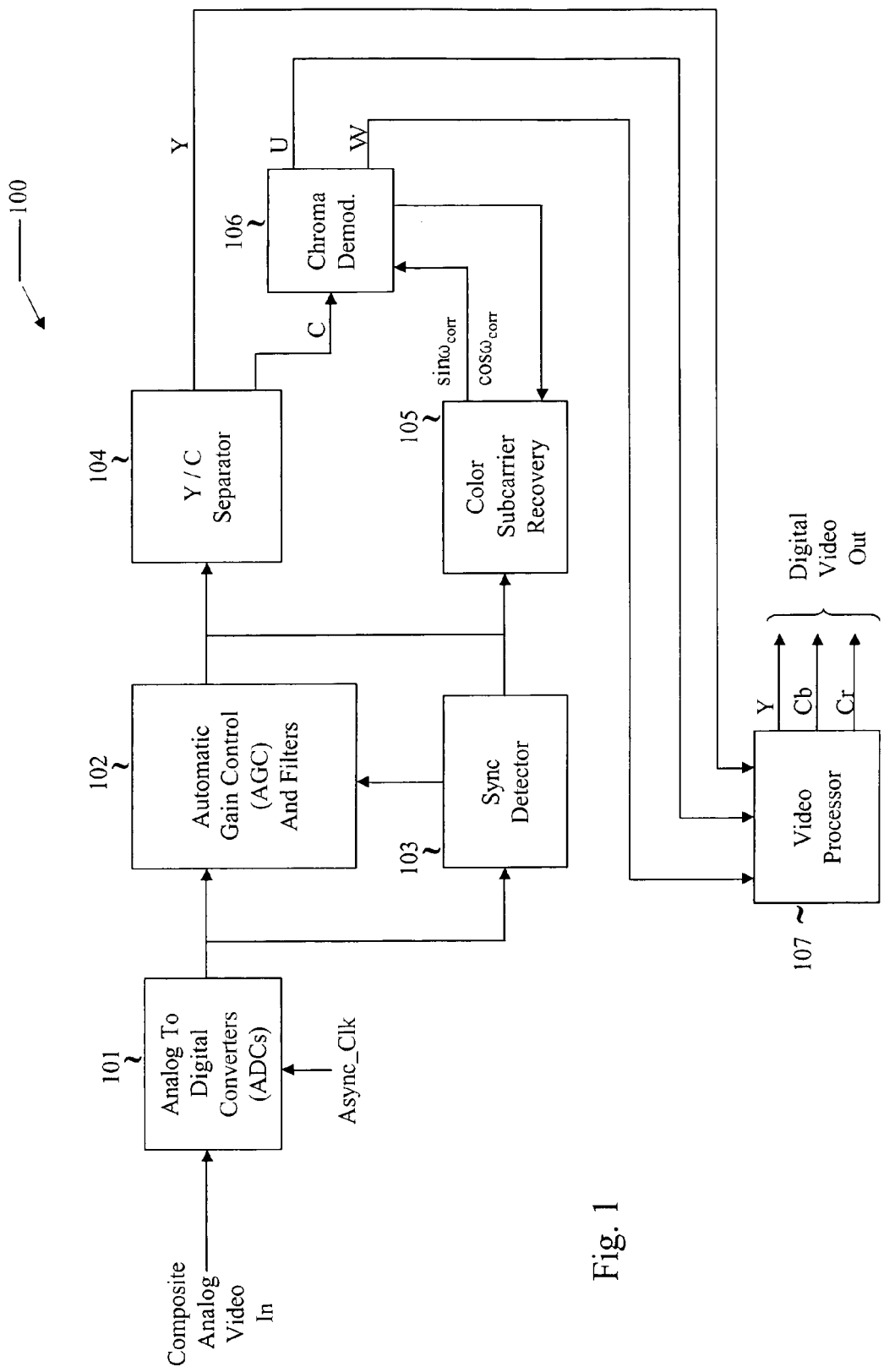
FIG. 1 is a high level block diagram of an exemplary analog to digital video decoder suitable for describing the present inventive principles.

FIG. 1 is a diagram of an exemplary analog to digital video decoder 100 suitable for describing the principles of the present invention. In the illustrated embodiment, video decoder 100 converts a composite analog video input signal, in the YC format, into digital video data in the YCrCb component video format, although the inventive principles are not necessarily limited thereto.

In video encoder 100, the composite analog video input is converted into composite digital video in the YC format by analog to digital converters (ADCs) 101 in response to a local asynchronous (ASYNC_CLK) clock signal. The digitized YC video data are then passed through automatic gain control (AGC) and filters block 102. A sync detector 103 detects the vertical synchronization (VSYNC) signal, which controls the timing of the playback of each display field, and the horizontal synchronization signal (HSYNC), which controls the timing of the playback of each display line.

Y/C separator block 104 next separates the digital Y and C components of the digitized composite video data stream. The C component is demodulated into U and V color components by color subcarrier recovery block 105 and chroma demodulation block 106, described in further detail below. Additionally, color subcarrier recovery block 105 provides the phase relationship signals ($\Phi_{IA}$, $\Phi_{IB}$, and $\Phi_{IC}$ to Y/C separator block 104 for aligning the pixel data from lines display data, as discussed below in conjunction with FIG. 3. The Y component output from Y/C separator 104 is passed directly to video processor 107 for further processing to generate the Y component of the output YCrCb digital component video signal.

FIG. 2A is an amplitude versus frequency plot of a representative composite video signal. In the NTSC system, the color subcarrier frequency $f_{sc}$ is 3.58 MHz and the composite signal is represented as:

$$\text{Composite} = Y + U \sin \omega t + V \cos \omega t$$

in which Y is the luminance component, U is the difference between Y component and the blue color content, V is the difference between the Y component and the red color content, $\omega = 2\pi f_{sc}$, and the chroma component $C = U \sin \omega t + V \cos \omega$.

For a PAL system, the color subcarrier frequency is 4.43 MHz and the composite signal is represented as:

$$\text{Composite} = Y + U \sin \omega \pm V \cos \omega t.$$

Figure 2B:
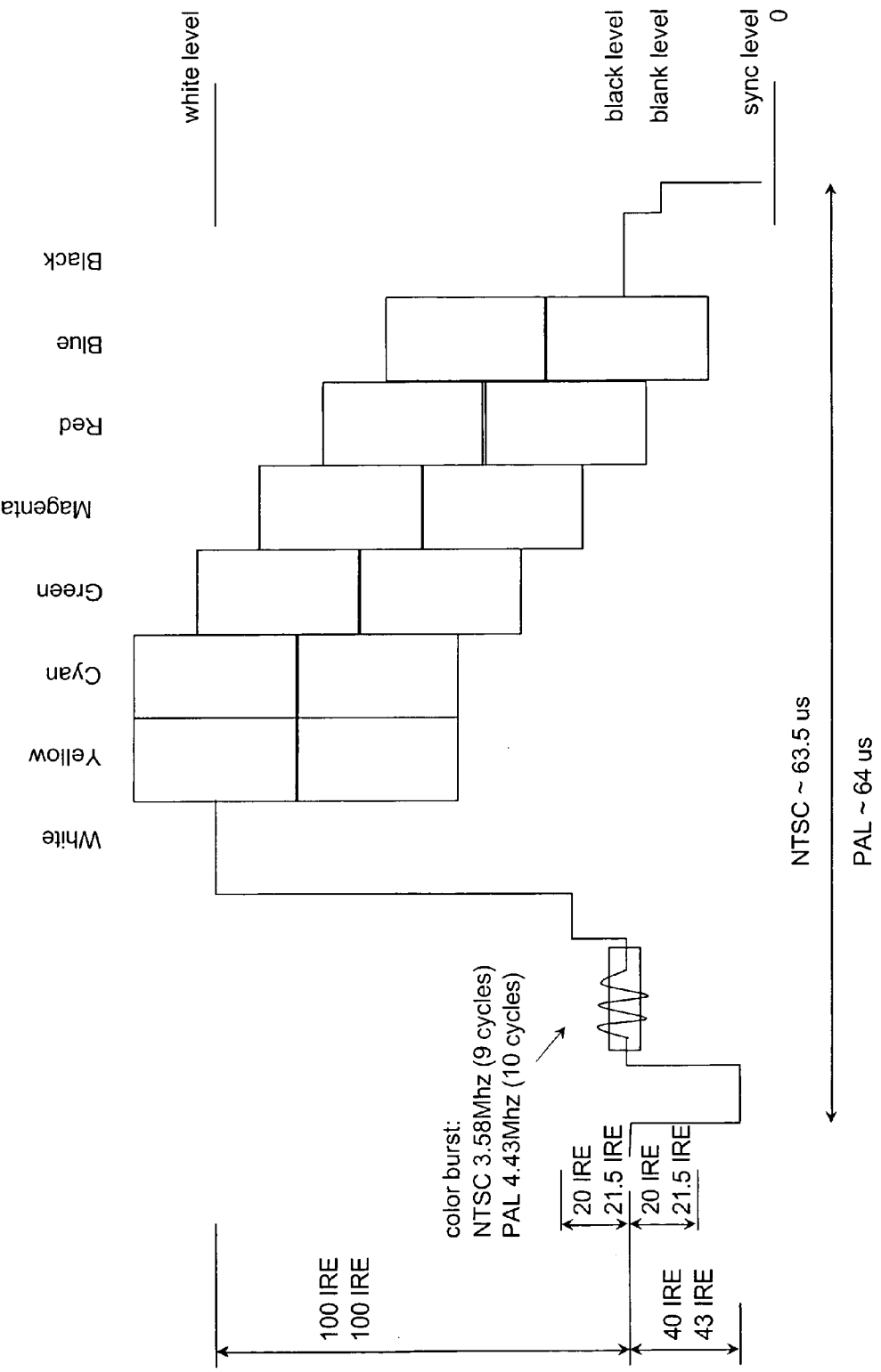
FIG. 2B is an amplitude versus time plot illustrating one line of representative display data in the composite video format.
Figure 3:
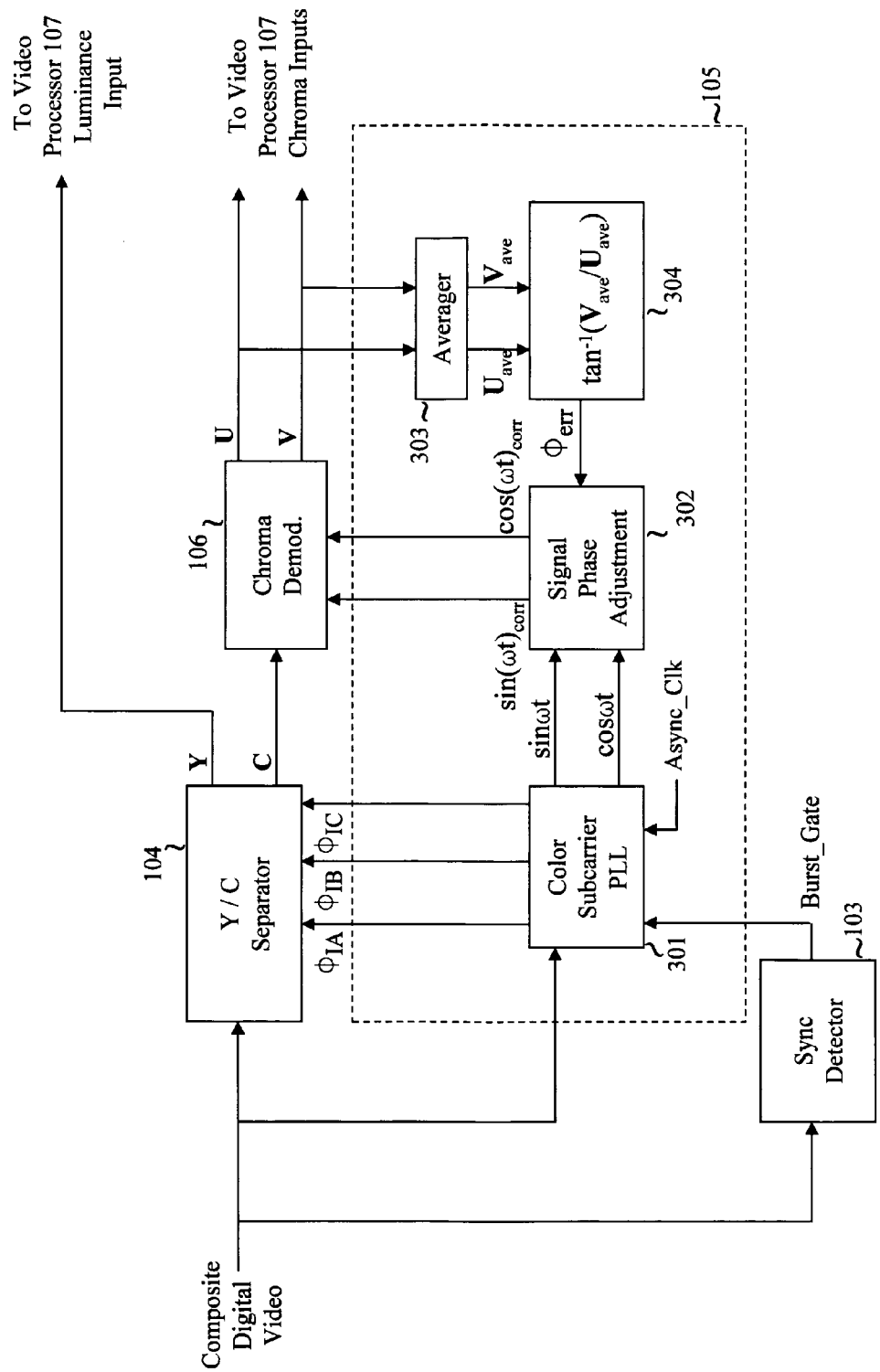
FIG. 3 illustrates in further detail the color subcarrier recovery and chroma demodulation blocks of FIG. 1, and emphasizing exemplary chroma phase relationship correction circuitry embodying the present inventive principles.

FIG. 2B illustrates one display line of pixels as composite video data, for both the NTSC and PAL system. Vertically, representations are made in Institute of Radio Engineers (IRE) units, and horizontally, are made in units of time. Generally, each line is initiated with the HSYNC pulse, followed by the color burst signal, which is essentially a sample of the color subcarrier, and finally the actual Y and C modulated data in the active video region FIG. 3 is a block diagram of the chroma recovery and demodulation portions of video encoder 100 of FIG. 1, and emphasizing color subcarrier recovery block 105 embodying the principles of the present invention. During demodulation of the C component, chroma demodulator 106, shown in both FIGS. 1 and 3, first multiplies the C component output of Y/C separator block 104 respectively by two (2) times the corrected demodulating signal $\sin(\omega t)_{corr}$ and two (2) times the corrected demodulating signal $\cos(\omega t)_{corr}$, from color subcarrier recovery block 105, to generate two intermediate signals M1 and M2. The angular frequency $\omega = 2\pi f_{sc}$, as described above. For an NTSC system:

$$M1 = U - U \cos 2\omega t_{corr} + V \sin 2\omega t_{corr}$$

$$M2 = V + V \cos 2\omega t_{corr} + U \sin 2\omega t_{corr}$$

For a PAL system:

$$M1 = U - U \cos 2\omega t_{corr} \pm V \sin 2\omega t_{corr}$$

$$M2 = V + V \cos 2\omega t_{corr} \pm U \sin 2\omega t_{corr}$$

For either the NTSC or the PAL systems, chroma demodulator 106 then extracts the U and V components by performing low pass filtering on the intermediate signals M1 and M2 to remove the high frequency signals at the angular frequency $2\omega t$.

The corrected signals $\sin(\omega wt)_{corr}$ and $\cos(\omega t)_{corr}$ are generated by chroma phase correction circuitry 300 within color subcarrier recovery block 105 of FIG. 1. Advantageously, chroma phase correction circuitry 300 minimizes the phase error between the local $\sin(\omega t)_{corr}$ and $\cos(\omega t)_{corr}$ signals and the color subcarrier. Consequently, anomalies in the video display, such as color shifts and Hanover Bars, are correspondingly minimized.

In the illustrated embodiment, a color subcarrier phase—locked loop (PLL) 301 generates uncorrected local signals $\sin(\omega t)$ and $\cos(\omega t)$, which are locked in phase within three degrees (3°) of the color burst signal received with each received display line of composite video data. In particular, color subcarrier PLL 301 locks to an average frequency of the color burst signals of many display lines, which introduces the phase error discussed below. Sync detector 103 generates a BURST_GATE signal, which gates the received color burst to color subcarrier PLL 301 in response to the preceding HSYNC pulse for the corresponding display line of data.

The uncorrected signals $\sin(\omega t)$ and $\cos(\omega t)$ are adjusted in phase by signal phase adjustment block 302 to generate the corrected local signals $\sin(\omega t)_{corr}$ and $\cos(\omega t)_{corr}$. Specifically, averaging circuitry ("averager") 303 takes the average value of the demodulated U and V color components output from chroma demodulator 106. An error correction value $\phi$ is determined by error calculation block 304 as the inverse tangent of the averaged values $U_{ave}$ and $V_{ave}$:

$$\phi = \tan^{-1}(V_{ave}/U_{ave})$$

Ideally, if the uncorrected signal $\sin(\omega t)$ were exactly locked in phase with the color burst signal during the color burst period, the U color component would have an amplitude proportional to the amplitude of color burst signal and the V color component would have an amplitude of zero (0). In this case, the value of $\phi = \tan^{-1}(V_{ave}/U_{ave})$ also would equal zero (0). However, in actual applications, a phase error of up to plus or minus three degrees (±3°) will typically exist between the color burst signal and the uncorrected $\sin(\omega t)$ signal, and hence the value of V during the color burst period and phase correction value $\phi$ will have non—zero values.

Phase correction value $\phi_{rr}$ is fed-back to signal phase adjustment block 302, which adjusts the phase of the uncorrected signals sin(ωt) and cos(ωt) and to generate the corrected signals sin(ωt)$_{corr}$ and cos(ωt)$_{corr}$.

During the active video region period of the corresponding display line, the corrected signals sin(ωt)$_{corr}$ and cos(ωt)$_{corr}$ are utilized to generate the U and V color components, which are then passed to video processor to generate the digital chrominance components Cb and Cr. In the illustrated embodiment, error calculation block 304 is inactive and the value of $\phi_{err}$ of the phase error is kept constant during the active video region.

In the illustrated embodiment, color subcarrier PLL 301 phase locks the uncorrected signals sin(ωt) and cos(ωt) within ±three (3) degrees of the phase of the color burst. Hence, only small values of phase correction value φ must be generated. Consequently, error calculation block 304 is preferably based on a lookup table stored in non-volatile memory, or similar relatively uncomplicated circuitry.

Advantageously, corrected signals sin(ωt)$_{corr}$ and cos(ωt)$_{corr}$ are generated for every display line of each display frame. Hence, even though color subcarrier PLL 311 locks to an average frequency of the color bursts of many display lines, any phase errors resulting from the averaging are corrected with every display line during the generation of corrected signals sin(ωt)$_{corr}$ and cos(ωt)$_{corr}$. Additionally, embodiments of the present principles support the control of sources, which are not closely constrained in SCH phase relationship.

Figure 4A:
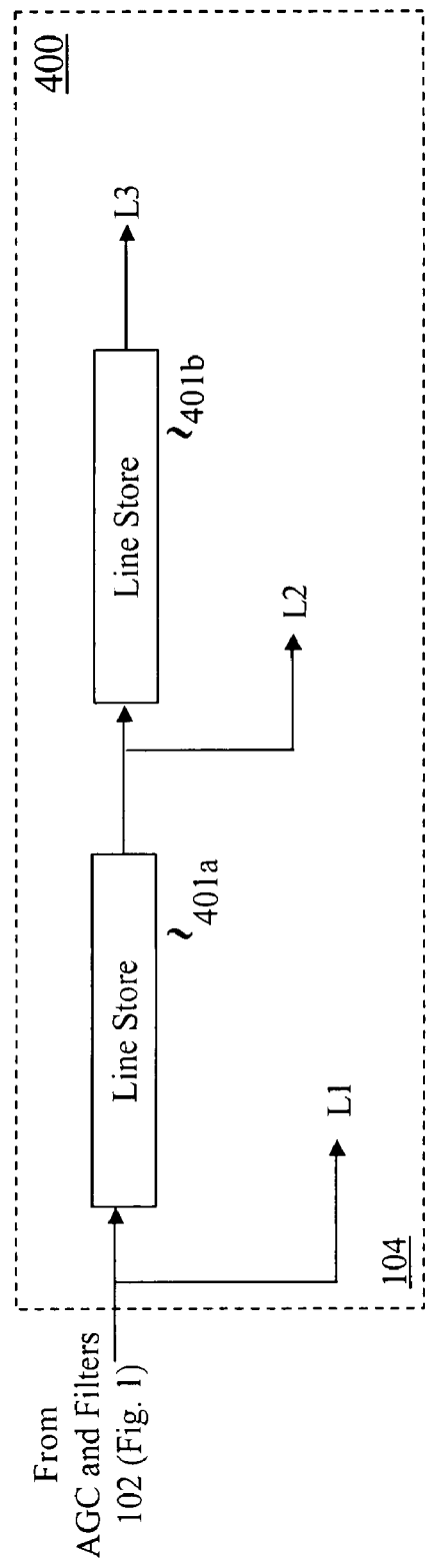
FIGS. 4A and 4B are block diagrams illustrating a representative luminance (Y)/chrominance (C) separator circuit according to one embodiment of the present inventive principles.
Figure 4B:
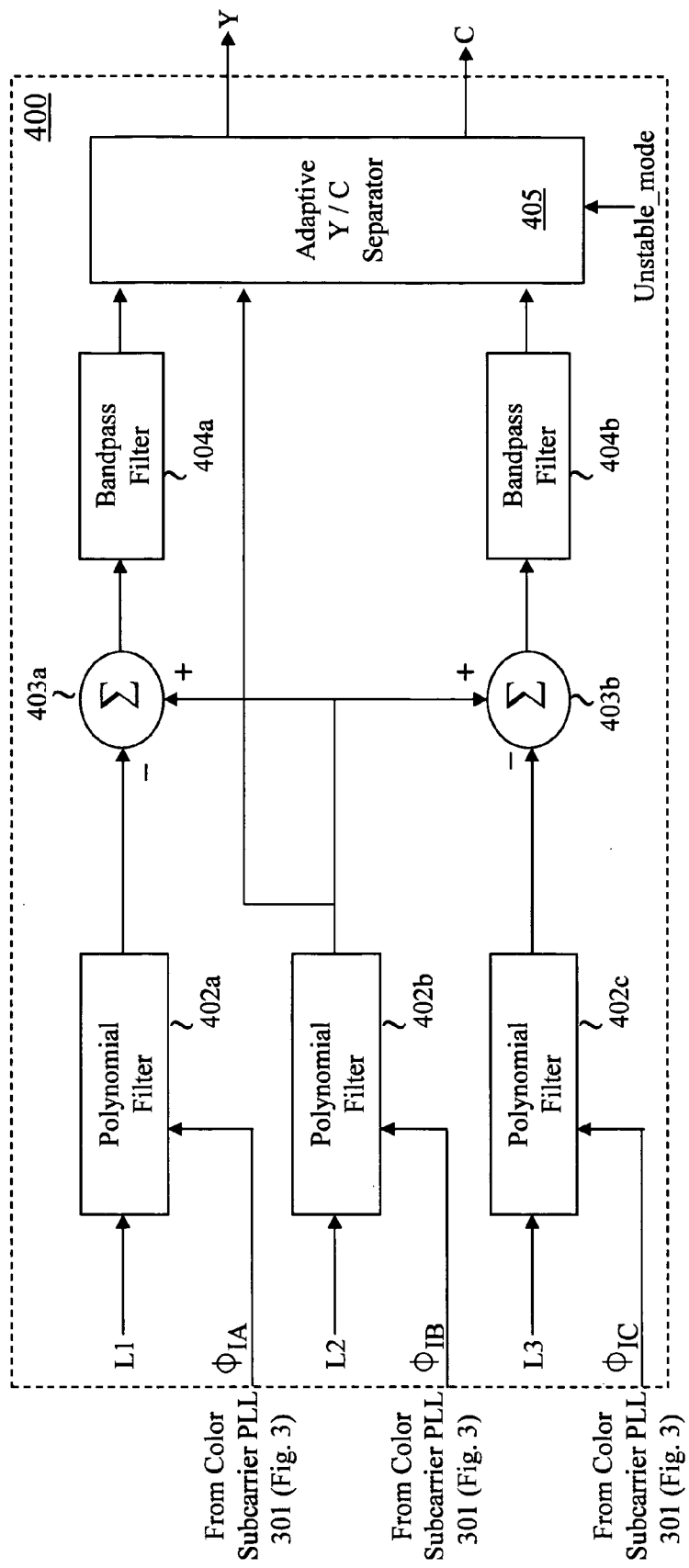

FIGS. 4A and 4B are block diagrams of first representative embodiment of Y/C separation circuitry 104 of FIG. 1, according to the principles of the present invention.

As shown in FIG. 4A, for an NTSC video processing embodiment, Y/C separation circuitry 105 receives the digitized video data from AGC and filters block 102 of FIG. 1. For NTSC processing, the received video data stream is passed through two line store blocks 401a and 401b. Specifically, substream L1, received directly from AGC and filters block 102, contains the pixel data of the next display line to be processed, substream L2, output from line store 401a, contains the pixel data for the current display line being processed and substream L3, output from line store 401b, contains the pixel data for the previous display line processed. Ideally, in NTSC embodiments, the pixel data of current display line L2 is one hundred and eighty (180) degrees out of phase with the pixel data of next display line L1 and the pixel data of previous display line L3.

In PAL embodiments of the present invention, four line stores extract the pixel data for the current line, the two previous lines which were processed, and the following two lines which will be processed. In an ideal PAL environment, pixel data are two hundred and seventy (270) degrees out of phase on display line by display line basis.

For the NTSC embodiment shown in FIG. 4A, the pixel data of current display line L2 may not be precisely one hundred and eighty (180) degrees out of phase with the pixel data of next display line L1 and previous display line L3. In particular, if the pixel data for the pixels of display line L2 lead in phase the pixel data of the corresponding pixels of prior display line L3, the pixel data of current line L2 lag in phase with the pixel data of corresponding pixels of next display line L1. Similarly, if the phase of the pixel data of the pixels of current line L2 lag in time with the pixel data of the pixels of previous display line L3, then the pixel data of the pixels of current display line L2 lead in phase with the pixel data of the pixels of following display line L1. Likewise, for a PAL embodiment, the pixel data from line to line may not precisely be out of phase by the two hundred and seventy (270) degrees set out in the PAL standard.

According to the principles of the present invention, phase adjustments are made to the pixel data of display lines L1, L2, and L3, such that the proper line to line phase relationships according to the NTSC or PAL standards are maintained.

In the illustrated embodiment of FIG. 4A, line stores 401a and 401b comprise buffers which receive free running active video data from AGC and filters block 102 of FIG. 1. Each line store 401a-401b wraps after a fixed number of clock signal periods M/N, in which M is an integer number representing the number of ideal clock signal periods per display field and N is an integer number representing the number of video lines per field. Line stores 401a and 401b are reset once per video display field.

Color subcarrier PLL 301 of FIG. 3, operating from the local asynchronous clock signal ASYNC_CLK, locks the digitized color burst of current display line L1 with the corrected local clock signals sin(ωt)$_{corr}$ and cos(ωt)$_{corr}$ running at the local color subcarrier frequency. In the illustrated embodiment, color subcarrier PLL 301 includes a proportional integral loop filter, which generates an integral output signal and a proportional output signal. When the local clock signals sin(ωt)$_{corr}$ and cos(ωt)$_{corr}$ lock with the color burst for current display line L1, the proportional output signal settles to a value of zero (0) and the integral output signal settles to a given value. The integral output signal is multiplied by three (3) constants to generate the phase relationship signals $\Phi_{IA}$, $\Phi_{IB}$, and $\Phi_{IC}$.

The signal ΦIA is proportional to the phase relationship between the pixel data of next display line L1 relative to local clock signals sin(ωt)$_{corr}$ and cos(ωt)$_{corr}$, as locked to the color burst of current display line L2. The signal $\Phi_{IB}$ is proportional to the phase relationship between the pixel data of current display line L2 relative to local clock signals sin(ωt)$_{corr}$ and cos(ωt)$_{corr}$, as locked to the color burst of current display line L2. The signal $\Phi_{IC}$ is proportional to the phase relationship between the pixel data of previous display line L3 relative to local clock signals sin(ωt)$_{corr}$ and cos(ωt)$_{corr}$, as locked to the color burst of current display line L2.

As shown in FIG. 4B, phase relationship signals $\Phi_{IA}$, $\Phi_{IB}$, and $\Phi_{IC}$ are passed to a set of polynomial filters 402a-402c for selecting the sets of polynomial filter coefficients utilized by polynomial filter 402a-402c to interpolate the video data from display lines L1, L2, and L3, respectively. In particular, polynomial filters 402a-402c, in response to the selected set of filter coefficients, interpolate the chroma components from the pixel data of display lines L1, L2, and L3 such that the data samples are aligned in phase. Hence, when the pixel values of the phase aligned pixel data streams from previous line L3 and following line L1 are subtracted from the pixel values of current line L2 in, the effects from any differences in phase, from the ideal values discussed above, between the pixel of display lines L2 and L1 and display lines L2 and L3 are minimized.

Summers 403a and 403b remove the luma (Y) components from the corresponding phase aligned streams of pixel data. The streams of data output from summers 403a and 403b are then passed through a pair of bandpass filters 404a and 404b to remove any remaining data in the luma band. The resulting extracted chroma (C) data are sent to an adaptive Y/C separator 405. The luma (Y) data for the current line L2 is extracted by comb filtering the difference between pixel data values of current line L2 and subtracting the interpolated, bandpass and adaptively comb filtered chrominance data C. An exemplary Y/C separator, suitable for utilization as Y/C separator, is described in copending and coassigned U.S.

patent application Ser. No. 10/862,685, filed Jun. 7, 2004, and entitled Adaptive Circuit for Y-C Separation, incorporated herein by reference.

If phase difference between lines is greater than a predetermined threshold, for example, plus or minus one hundred parts per million (100 PPM) in number of clock periods of local asynchronous clock signal ASYNC_CLK, then a determination is made that the source of the composite video data is unstable, and the signal UNSTABLE_MODE is asserted. Similarly, UNSTABLE_MODE signal is asserted when the line to line error between HSYNC pulses is large. When the UNSTABLE_MODE signal is asserted, adaptive Y/C separator circuit 405 switches to a notch mode, in which the comb filter is disabled and a notch filter is applied to achieve Y/C separation.

Figure 5A:
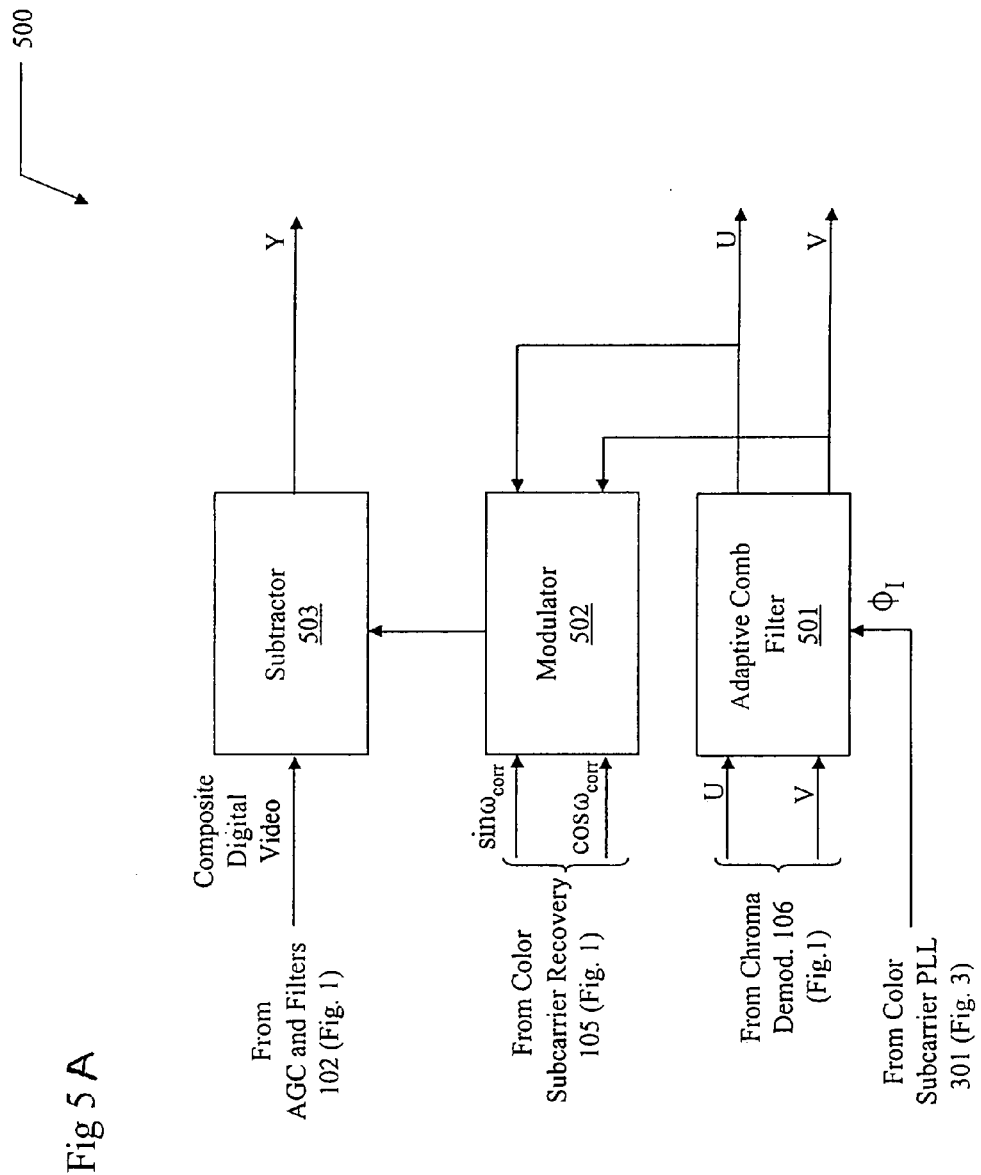
FIGS. 5A-5C are block diagrams illustrating a representative Y/C separator circuit according to another embodiment of the present invention.
Figure 5B:
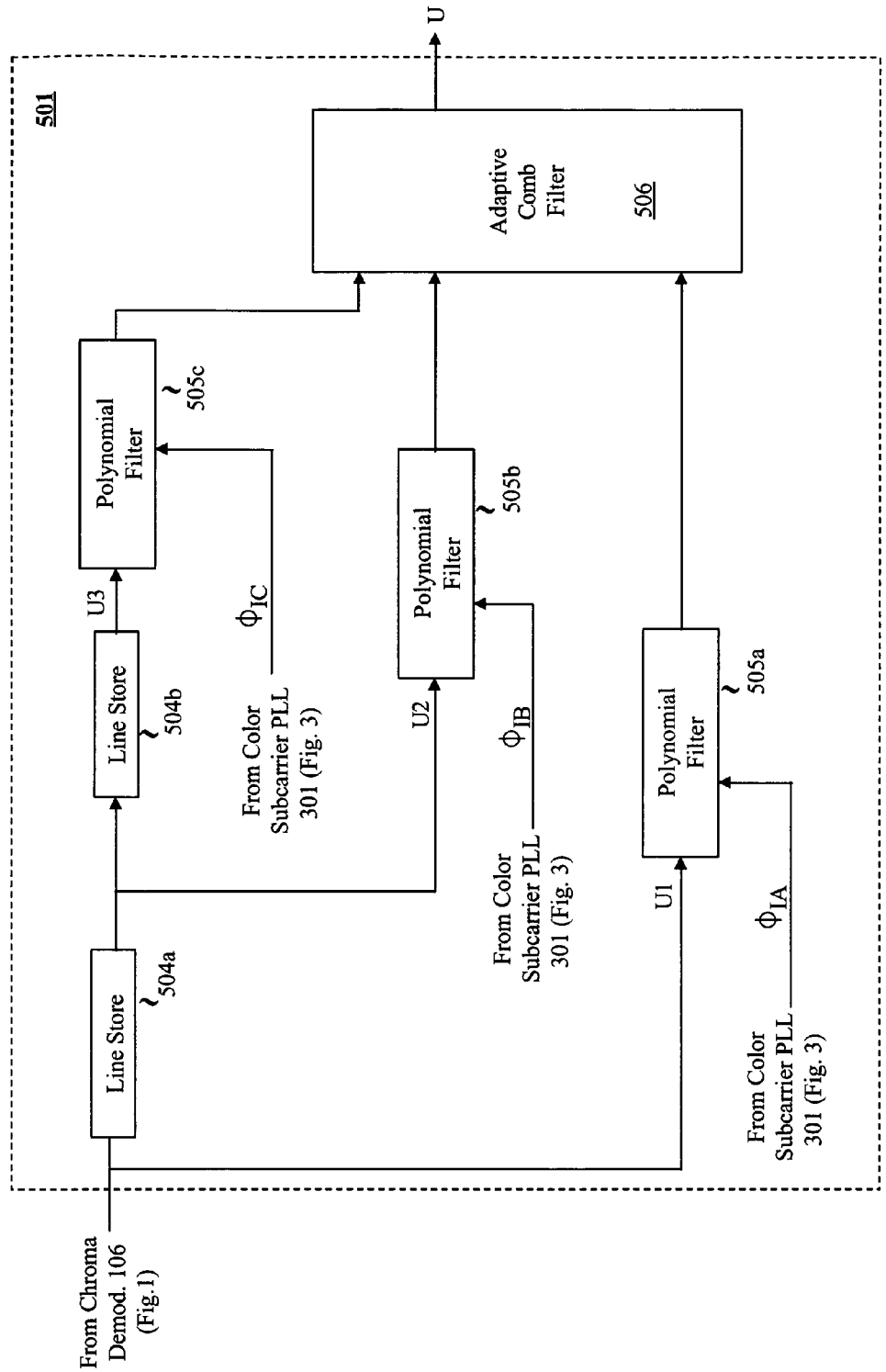
Figure 5C:
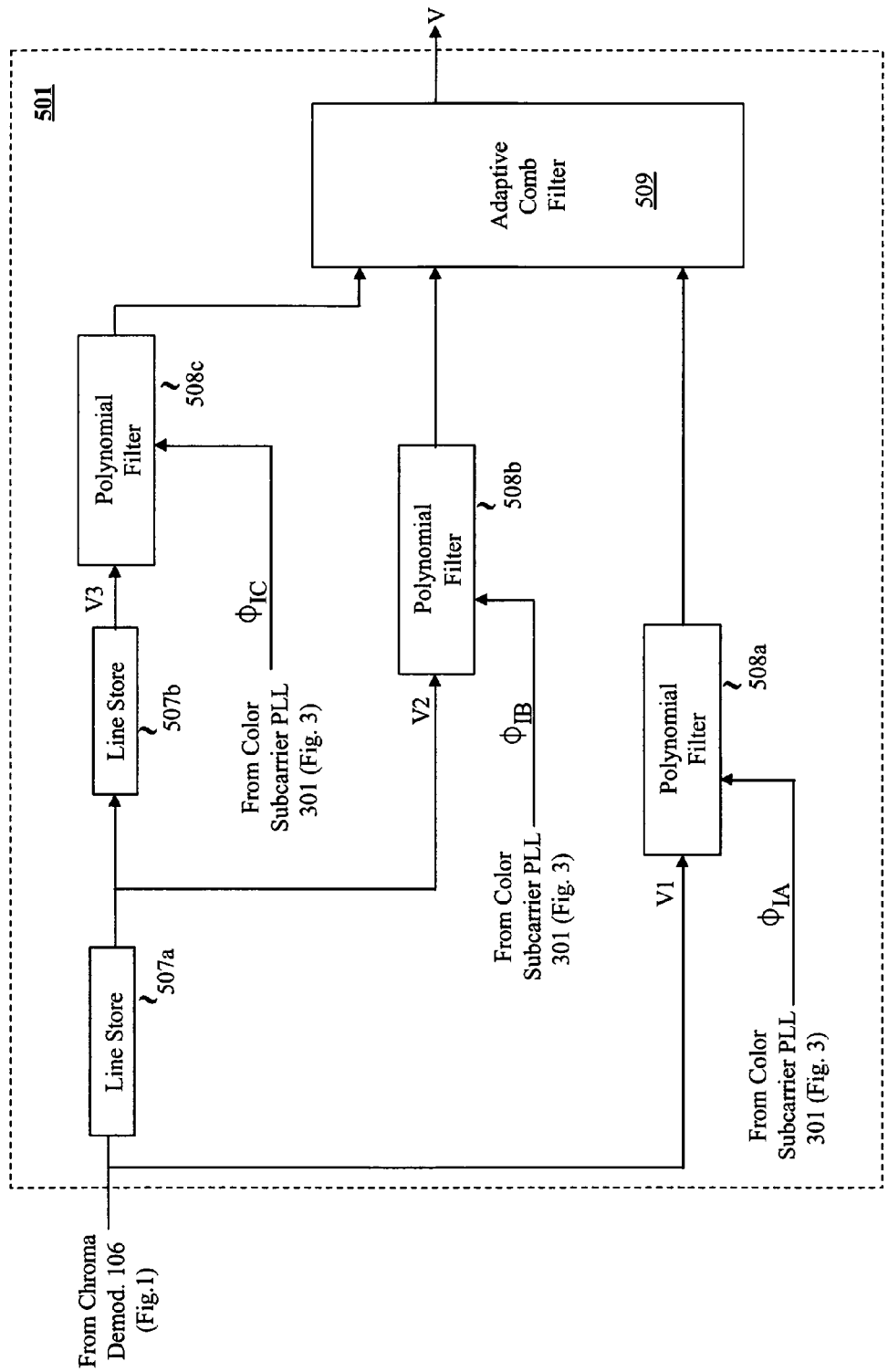

FIGS. 5A-5C are block diagrams of an alternate Y/C separation circuit 500, suitable in one application for utilization in Y/C separator 104 of FIG. 3. In particular, the U and V chroma components extracted by chroma demodulator 106 of FIG. 1 are first passed through an adaptive comb filter 501. Similar to the embodiment of FIGS. 4A and 4B, adaptive comb filter 501 aligns by interpolation the demodulated U and V chroma data in response to phase relationship signals $\Phi_{IA}$, $\Phi_{IB}$, and $\Phi_{IC}$ generated by color subcarrier PLL 301 of FIG. 3. The phase aligned U and V chroma data are then passed through video processor 107 by FIG. 1 for processing.

Additionally, the phase aligned U and V chroma data generated by adaptive comb filter 501 are remodulated by a modulator 502 in response to the corrected sine and cosine clock signals, $\sin(\omega t)_{corr}$ and $\cos(\omega t)_{corr}$, generated by color subcarrier recovery block 105 of FIG. 1. As discussed above, the $\sin(\omega t)_{corr}$ and $\cos(\omega t)_{corr}$ signals have been phase aligned with the color subcarrier within the color burst of the incoming composite digital video signal. The resulting phase aligned and remodulated U and V chroma data are then subtracted from the composite digital video signal output from AGC and filter blocks 102 of FIG. 1 by subtractor 503 to extract the Y component of the pixel data of the current display line.

FIGS. 5B AND 5C respectively illustrate the U and V chroma processing paths of adaptive comb filter 501 of FIG. 5A. As shown in FIG. 5B, the U chroma processing path includes line stores 504A and 504B which separate the U chroma data substreams U2 and U3, respectively corresponding to current display line L2 and previous display line L3, from the U chroma data U1 from following display line L1. The U1, U2, and U3 data samples are passed to polynomial filters 505a-505c, which in response to the phase relationship signals $\Phi_{IA}$, $\Phi_{IB}$, and $\Phi_{IC}$, adjust the phase relationship between U chroma data samples as discussed above. The outputs from polynomial filters 505a-505c are passed to adaptive comb filter 506, which generates the output U chroma data sample stream.

In FIG. 5C, the V chroma processing path includes line stores 507a and 507b which separate the V chroma data substreams V2 and V3, respectively corresponding to current display line L2 and previous display line L3, from the V chroma data V1 from following display line L1. The V1, V2, and V3 data samples are passed to polynomial filters 508a-508c, which in response to the phase relationship signals $\Phi_{IA}$, $\Phi_{IB}$, and sic, adjust the phase relationship between V chroma data samples as discussed above. The outputs from polynomial filters 508a-508c are passed to adaptive comb filter 509, which generates the output V data sample stream.

Figure 6A:
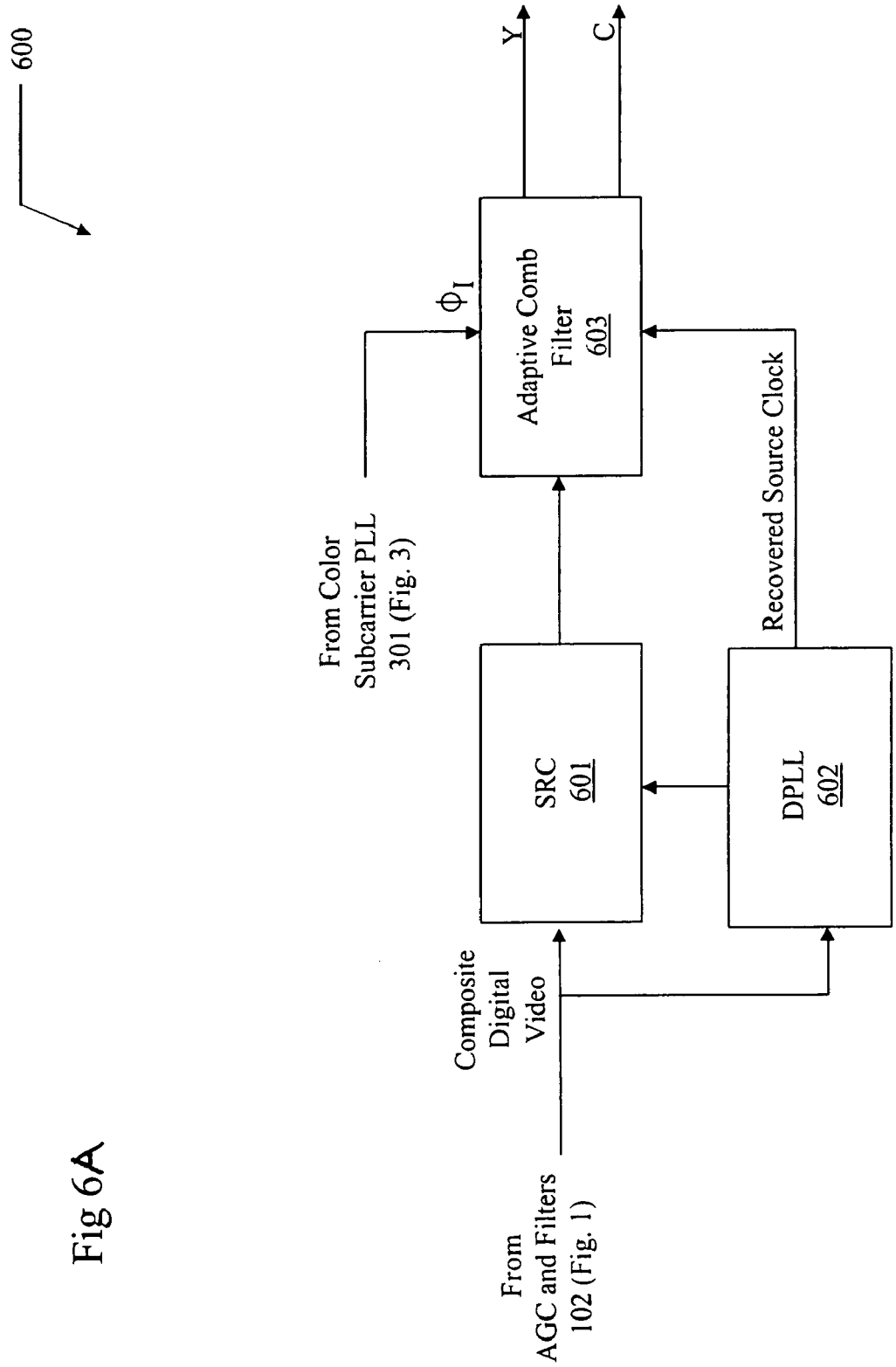
FIGS. 6A-6B are block diagrams illustrating a representative Y/C separator circuit according to a further embodiment of the present invention.
Figure 6B:
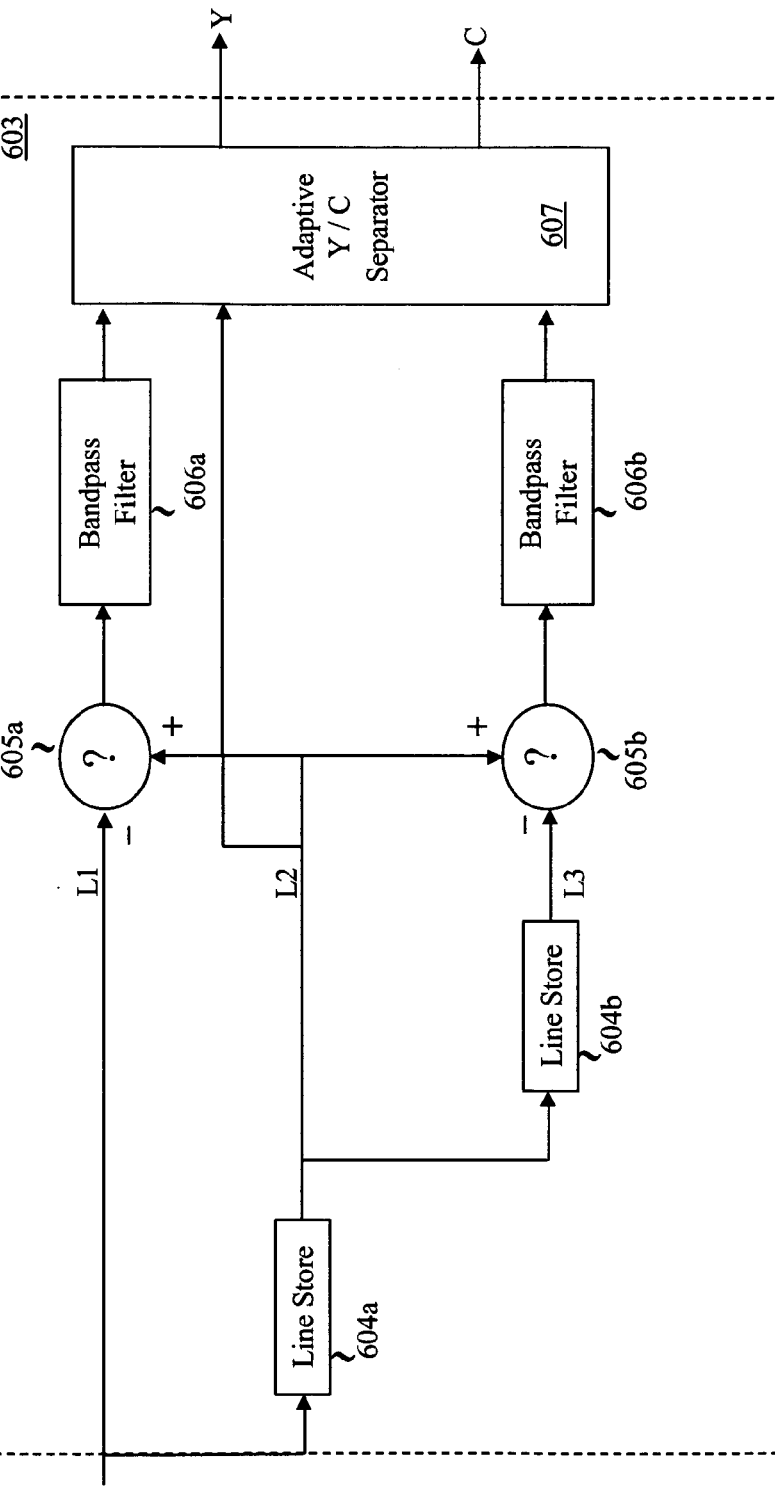

FIGS. 6A and 6B illustrate further exemplary Y/C separation circuitry 600 embodying the principles of the present invention. In Y/C separation circuitry 600, the composite digital video signal, which has been sampled by asynchronous clock signal (ASYNC_CLK), is sample rate converted with a sample rate converter (SRC) 601 to the local color subcarrier frequency. Sample rate converter 601 is slaved off a phase locked loop (PLL) 602 which generates a line locked clock signal. The output stream from SRC 601, which is now at the frequency of the line locked clock signal, is provided to an adaptive comb filter 603.

Adaptive comb filter 603 phase aligns vertically adjacent composite video pixel data samples from a selected set of video display lines using a polynomial interpolator, similar to Y/C separation circuitry 104 of FIGS. 4A and 4B. Adaptive comb filtering on the phase aligned video pixel data is then performed to extract the Y and C video components.

FIG. 6B is a more detailed block diagram of adaptive comb filter 603 of FIG. 6A. Adaptive comb filter 601 includes line stores 604a and 604b, which separate the pixel data of following display line L1 from current display line L2, and previous display line L3. A summer 605a subtract the values of the pixel data of following display L1 from the values of the pixel data of current display line L2 and summer 605b subtracts the values of the pixel data of previous line L3 from the values of the pixel data of current display line L2. The outputs of summers 605a and 605b are then bandpass filtered by bandpass filters 606a and 606b, respectively. The filtered outputs from bandpass filters 606a and 606b, along with the pixel data for current display line L2, are then passed to an adaptive Y/C separator 607. Adaptive Y/C separator 607, is similar to adaptive Y/C separator 405 discussed above in conjunction with FIG. 4B.

In sum, embodiments of the principles of the present invention minimize line to line phase differences from the ideal during Y/C separation operations by aligning the data samples from a set of display lines prior to the addition and subtraction operations utilized during adaptive comb filtering to separate the Y and C components in the video data stream. In particular, interpolation operations are performed on the pixel data from a current line being processed, at least one previous line processed, and/or at least one following line which will be processed. The interpolation is based on the phase relationship between the color burst in the digital samples of the composite video signal and the local clock utilized to process the digital samples.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of separating a chroma data component from a video data stream comprising:
   determining a phase relationship between a color burst in digital video data samples of a composite video signal and a local clock signal which processes the digital video data samples;

in response to determining the phase relationship, performing interpolation filtering on the digital video data samples corresponding to first and second display lines to generate phase aligned video data samples; and performing adaptive filtering utilizing the phase aligned video data samples corresponding to the first and second display lines to separate the chroma component from the digital video data samples corresponding to the first display line.

2. The method of claim 1, further comprising prior to performing adaptive filtering:

subtracting values of the phase aligned video data samples corresponding to the second display line from values of the phase aligned video data samples corresponding to the first display line to remove a luma component from the phase aligned video data samples corresponding the first display line and generate a resulting stream; and bandpass filtering a resulting stream of video samples in the chrominance band to generate a filtered and interpolated stream of video samples including the chroma component for utilization during adaptive filtering.

3. The method of claim 2, wherein performing adaptive filtering comprises performing adaptive comb filtering.

4. The method of claim 1, further comprising:

prior to interpolating, demodulating the chroma component of the digital video data samples;

after adaptive filtering, modulating a stream of phase aligned and filtered data generated during adaptive filtering with the color burst to generate a modulated stream of data samples; and subtracting values of the modulated stream of data samples from values of digital data samples of the composite video data signal to extract a luma component.

5. The method of claim 1, further comprising prior to interpolation filtering:

converting a sample rate of the digital video data samples from the composite video signal to a sample rate of a line locked clock.

6. The method of claim 1, wherein the composite video signal comprises a selected one of National Television Standards Committee (NTSC) and Phase Alternating Line (PAL) formatted video data.

7. The method of claim 1, wherein determining the phase relationship comprises determining the phase relationship with a phase locked loop locked to the color burst and running off a clock signal performing analog to digital conversion on the composite video signal to generate the digital video samples.

8. Video processing circuitry for separating chroma data from a video data stream comprising:

phase relationship detection circuitry for determining a phase relationship between a color burst in digital video data samples of a composite video signal and a local clock signal processing the digital video data samples;

interpolation filters for performing interpolation filtering on the digital video data samples corresponding to first and second display lines in response to the phase relationship to generate phase aligned video data samples; and an adaptive filter performing adaptive filtering utilizing the phase aligned video data samples corresponding to the first and second display lines to separate the chroma component from the digital video data samples corresponding to the first display line.

9. The video processing circuit of claim 8, further comprising:

a subtractor for subtracting values of the corresponding phase aligned video data samples of the first and second display lines to remove the luma component from the phase aligned video data samples corresponding the first display line to generate a resulting stream of video samples; and a bandpass filter for filtering the resulting stream of video samples in the chrominance band to generate a filtered and interpolated stream of video samples including the chroma component for utilization during adaptive filtering.

10. The video processing circuit of claim 9, wherein the adaptive filter comprises an adaptive comb filter.

11. The video processing circuit of claim 8, further comprising:

a demodulator for demodulating the chroma component of the digital video data samples prior to interpolating;

a modulator for modulating a stream of phase aligned and filtered data generated during adaptive filtering with the local clock signal to generate a modulated stream of data samples; and subtraction circuitry for subtracting values of the modulated stream of data samples from values of digital data samples of the composite video data signal to extract a luma component.

12. The video processing circuit of claim 8, further comprising:

a sample rate converter for converting a sample rate of digital video data samples from the composite video signal to a sample rate of a line locked clock for filtering by the interpolation filters.

13. The video processing circuit of claim 8, wherein the composite video signal comprises a selected one of National Television Standards Committee (NTSC) and Phase Alternating Line (PAL) formatted video data.

14. The video processing circuit of claim 8, further comprising a phase-locked loop for determining a phase relationship comprises determining a phase relationship between a color burst portion of the composite video signal and the local clock signal.

15. A video processing system comprising:

an analog to digital converter for converting an analog composite video stream to digital samples, the analog composite video stream including a color burst;

a phase locked loop including a phase—frequency relationship detector for determining a phase relationship between a locally generated clock signal and data of the color burst;

luminance—chrominance separation circuitry for separating luminance and chrominance components from the digitized composite video stream comprising:

an interpolator for performing interpolation filtering on the digitized composite video stream corresponding to first and second display lines in response to the phase relationship to generate phase aligned video data; and a filter for performing adaptive filtering utilizing the phase aligned video data corresponding to the first and second display lines to separate the chroma component from the phase aligned video data corresponding to the first display line.

16. The video processing system of claim 15, wherein the filter comprises an adaptive comb filter.

17. The video processing system of claim 15, further comprising:
- a demodulator for demodulating the chroma component into color component data for input to the filter, the filter aligning samples of the color component data;
- a modulator for remodulating the phase aligned color component data with the local clock signal to generate a modulated stream of data samples; and
- subtraction circuitry for subtracting values of the modulated stream of data samples from values of digital data samples of the composite video data signal to extract the luma component.

18. The video processing system of claim 15, further comprising a sample rate converter for converting a sample rate of digital video data samples from the composite video signal to a sample rate of the local generated clock signal for filtering by the adaptive filter.

* * * * *